United States Patent
Chen et al.

(10) Patent No.: US 12,304,996 B2
(45) Date of Patent: *May 20, 2025

(54) ORGANIC FRAME MATERIAL HAVING ISOPOLY-MOLYBDIC ACID METAL FOR MANUFACTURING POLYLACTIC ACID AND METHOD OF MANUFACTURING THE SAME

(71) Applicant: Changzhou University, Changzhou (CN)

(72) Inventors: Qun Chen, Changzhou (CN); Chenchen Qin, Changzhou (CN); Shengchun Chen, Changzhou (CN); Junfeng Qian, Changzhou (CN); Mingyang He, Changzhou (CN); Meijun Wei, Changzhou (CN)

(73) Assignee: Changzhou University, Changzhou (CN)

( * ) Notice: Subject to any disclaimer, the term of this patent is extended or adjusted under 35 U.S.C. 154(b) by 516 days.

This patent is subject to a terminal disclaimer.

(21) Appl. No.: 17/874,311

(22) Filed: Jul. 27, 2022

(65) Prior Publication Data

US 2023/0167236 A1 Jun. 1, 2023

(30) Foreign Application Priority Data

Nov. 30, 2021 (CN) .......................... 202111473860.3

(51) Int. Cl.
*C08G 63/82* (2006.01)
*B01J 23/88* (2006.01)
*B01J 37/04* (2006.01)
*B01J 37/08* (2006.01)
*C08G 63/08* (2006.01)

(52) U.S. Cl.
CPC ............ *C08G 63/823* (2013.01); *B01J 23/88* (2013.01); *B01J 37/04* (2013.01); *B01J 37/08* (2013.01); *C08G 63/08* (2013.01)

(58) Field of Classification Search
CPC ........ C08G 63/08; C08G 63/823; B01J 23/88; B01J 37/04; B01J 37/08
See application file for complete search history.

(56) References Cited

U.S. PATENT DOCUMENTS

| 12,011,708 B2 * | 6/2024 | He | B01J 37/08 |
| 2009/0198079 A1 * | 8/2009 | Schubert | C07C 51/412 |
| | | | 556/55 |
| 2023/0158477 A1 * | 5/2023 | He | B01J 37/08 |
| | | | 502/325 |
| 2023/0159699 A1 * | 5/2023 | He | C07F 11/005 |
| | | | 528/357 |
| 2023/0167236 A1 * | 6/2023 | Chen | C08G 63/08 |
| | | | 528/277 |

FOREIGN PATENT DOCUMENTS

| CN | 105820182 | * | 8/2016 |
| CN | 107556485 | * | 1/2018 |

OTHER PUBLICATIONS

Sheng-Chun Chen et al "Highly selective aerobic oxidation of alcohols to aldehydes over a new Cu(II)-based metal-organic framework with mixed linkers", Catalysis Communications 95 (2017) 6-11 (Year: 2017).*

Ghorbanloo et al "Heterogeneous catalysis with a coordination modulation synthesized MOF: morphology-dependent catalytic activity", New J.Chem., 2017, 41, 3957 (Year: 2017).*

A. R. Middleton " Hetero- and Iso-Poly Acids", AR Middleton—Journal of Chemical Education, 1933 (Year: 1933).*

Rao Isopoly-Molybdic acids, Analytica Chimica Acta, vol. 12, 1955 (Year: 1955).*

(Continued)

*Primary Examiner* — Frances Tischler
*Assistant Examiner* — Gennadiy Mesh
(74) *Attorney, Agent, or Firm* — IDEA Intellectual Limited; Margaret A. Burke; Sam T. Yip (57) ABSTRACT

An organic frame material having isopoly-molybdic acid metal for manufacturing polylactic acid and method of manufacturing the same is provided. The chemical formula of the organic frame material having isopoly-molybdic acid metal is $[Cu(tfbtb)_{0.5}(\beta\text{-}Mo_8O_{26})0.5(H_2O)]$. tfbtb is a 2,3,5,6-tetrafluoro-bis(1,2,4-triazole-1-methyl) benzene ligand, and $[\beta\text{-}Mo_8O_{26}]$ is a $\beta$ type octamolybdate anion. Sodium molybdate dihydrate, copper salt and organic ligand 2,3,5,6-tetrafluoro-bis (1,2,4-triazole-1-methyl) benzene undergo hydrothermal reaction in a closed condition to form the organic frame material having copper containing isopoly-molybdic acid metal that has a three-dimensional structure. The synthesis method is simple with high yield and reproducibility. The organic frame material having isopoly-molybdic acid metal shows high catalytic activity towards the ring-opening polymerization of lactide. The resulting polylactic acid has a weight average molecular weight exceeding 60,000. The polylactic acid has great potential in the fields of packaging materials and medical high polymer materials.

10 Claims, 3 Drawing Sheets

(56) References Cited

OTHER PUBLICATIONS

Zhi-Hui Zhang et al "Fluorinated metal-organic frameworks of 1,4-bis(1,2,4-triazol-1-ylmethyl)-2,3,5,6-tetrafluorobenzene: synergistic interactions of ligand isomerism and counteranions", Dalton Trans., 2014, 43, 646-655. (Year: 2014).*

Dechy-Cabaret O., Martin Vaca B., Bourissou D., Controlled Ring-Opening Polymerization of Lactide and Glycolide, Chem. Rev. 2004, 104, 6147-6176.

Stanford M. J., Dove A. P., Stereocontrolled ring-opening polymerisation of lactide, Chem. Soc. Rev. 2010, 39, 486-494.

Abdel Fattah T. M., Pinnavaia T. J., Tin-substituted mesoporous silica molecular sieve (Sn-HMS): synthesis and properties as a heterogeneous catalyst for lactide ring-opening polymerization, Chem. Commun. 1996, (5), 665-666.

Yu K., Jones C. W. J., Elucidating the role of silica surfaces in the ring-opening polymerization of lactide: catalytic behavior of silica-immobilized zinc β-diiminate complexes, Catal. 2004, 222, 558-564.

Wanna N., Kraithong T., Khamnaen T., Phiriyawirut P., Charoenchaidet S., Tantirungrotechai J. , Aluminum- and calcium-incorporated MCM-41-type silica as supports for the immobilization of titanium(IV) isopropoxide in ring-opening polymerization of l-lactide and ε-caprolactone, Catal. Commun. 2014, 45, 118-123.

\* cited by examiner

FIG. 5

ORGANIC FRAME MATERIAL HAVING ISOPOLY-MOLYBDIC ACID METAL FOR MANUFACTURING POLYLACTIC ACID AND METHOD OF MANUFACTURING THE SAME

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE OF RELATED APPLICATION

This application is claiming priority from a Chinese patent application number 202111473860.3 filed on Nov. 30, 2021, the disclosure of which are incorporated herein by reference in their entirety.

FIELD OF THE INVENTION

The invention relates to the technical field of catalysts for polylactic acid. In particular, it relates to an organic frame material having isopoly-molybdic acid metal for manufacturing polylactic acid and a method of manufacturing the same.

BACKGROUND OF THE INVENTION

Polylactic acid (PLA) is an important biodegradable polymer polyester material. PLA is environmentally friendly, non-toxic, antibacterial, flame retardant, and has good biocompatibility and biodegradability. After its use, PLA can be completely degraded into carbon dioxide and water by common microorganisms. PLA products have been widely used in the fields of biomedicine and food packaging materials, for example controlled-release drugs, surgical sutures, fracture stabilization internal materials, cutlery, straws, film packaging, fibers, woven fabric, and 3D printing materials.

A common method to synthesize PLA with a high molecular weight is through ring-opening polymerization of lactide. The resulting PLA has strong mechanical properties. It is reported that many homogeneous organometallic compounds and Lewis acids can efficiently initiate the ring-opening polymerization of lactide (Dechy-Cabaret O., Martin Vaca B., Bourissou D. Chem. Rev. 2004, 104, 6147-6176; Stanford M. J., Dove A. P. Chem. Soc. Rev. 2010, 39, 486-494). However, the polymer prepared by the homogeneous catalyst usually contains impurities, such as metal residues. The impurities have adverse effects on the quality and usage of the product.

Most studies of ring-opening polymerization of lactide are based on metal derivatives of silica as support (Abdel Fattah T. M., Pinnavaia T. J. Chem. Commun. 1996, (5), 665-666; Yu K., Jones C. W. J. Catal. 2004, 222, 558-564; Wanna N., Kraithong T., Khamnaen T., Phiriyawirut P., Charoenchaidet S., Tantirungrotechai J. Catal. Commun. 2014, 45, 118-123). However, there is very limited research about using organic frame material with metal oxide salt to manufacture PLA with a high molecular weight by catalyzing the ring-opening polymerization of lactide.

SUMMARY OF THE INVENTION

This section is for the purpose of summarizing some aspects of embodiments of the invention and to briefly introduce some further embodiments. In this section, as well as in the abstract and the title of the invention of this application, simplifications or omissions may be made to avoid obscuring the purpose of the section, the abstract and the title, and such simplifications or omissions are not intended to limit the scope of the invention.

The present invention has been made in view of the above-mentioned problems.

Accordingly, one aspect of the present invention provides an organic frame material having isopoly-molybdic acid metal for manufacturing polylactic acid.

In an embodiment of the present invention, an organic frame material having isopoly-molybdic acid metal for manufacturing polylactic acid is provided. The organic frame material having isopoly-molybdic acid metal for manufacturing polylactic acid has a chemical formula of [Cu(tfbtb)$_{0.5}$($\beta$-Mo$_8$O$_{26}$)0.5(H$_2$O)], wherein tfbtb is a 2,3,5,6-tetrafluoro-bis (1,2,4-triazole-1-methyl) benzene ligand, and [$\beta$-Mo$_8$O$_{26}$] is a $\beta$ type octamolybdate anion.

In a further embodiment of the present invention, the organic frame material having isopoly-molybdic acid metal has a secondary structural unit being a triclinic crystal system, a space group of P-1, a molecular formula of C$_6$H$_6$CuF$_2$Mo$_4$N$_3$O$_{14}$, a molecular weight of 829.44, cell parameters of a=8.0830 (6) Å, b=8.1875 (6) Å, c=13.0890 (9) Å, $\alpha$=82.071 (6)°, $\beta$=79.008 (6)°, $\gamma$=78.452 (6)°, and a cell volume of 828.62 (11) Å$^3$, Z=2; and the organic frame material having isopoly-molybdic acid metal has a basic structure of a three-dimensional network structure of a copper ion coordinating with 2,3,5,6-tetrafluoro-bis (1,2,4-triazole-1-methyl) benzene and molybdate radical [$\beta$-Mo$_8$O$_{26}$].

Another aspect of the present invention provides a method of manufacturing the organic frame material having isopoly-molybdic acid metal for manufacturing polylactic acid. The method includes adding a copper salt, sodium molybdate dihydrate, 2,3,5,6-tetrafluoro-bis (1,2,4-triazole-1-methyl) benzene and distilled water to a reactor. Next, the reactor is heated in an oven for a period of time to form a mixture. The reactor is then cooled to room temperature. A dry centrifugation is performed on the mixture to obtain a crystal of the organic frame material having isopoly-molybdic acid metal. The crystal of the organic frame material having isopoly-molybdic acid metal is rinsed with deionized water and ethanol, then it is dried to obtain the organic frame material having isopoly-molybdic acid metal. The reactor is heated in the oven at a temperature ranging between 14° and 180° C. for a period of time between 24 and 72 hours.

In a further embodiment of the present invention, the copper salt is selected from any one or more of copper nitrate, copper acetate and copper sulfate.

In a further embodiment of the present invention, the mass ratio between the copper salt and the sodium molybdate dihydrate is between 1:1 and 1:2.

In a further embodiment of the present invention, the mass ratio between the 2,3,5,6-tetrafluoro-bis (1,2,4-triazole-1-methyl) benzene and the copper salt is between 1:2 and 1:6.

In a further embodiment of the present invention, the ratio between the 2,3,5,6-tetrafluoro-bis (1,2,4-triazole-1-methyl) benzene and the sodium molybdate dihydrate is between 1:2 and 1:8.

In a further embodiment of the present invention, each 0.01 mmol of 2,3,5,6-tetrafluoro-bis (1,2,4-triazole-1-methyl) benzene corresponds to 4 to 7 ml of water.

Yet another aspect of the present invention provides an application of the organic frame material having isopoly-molybdic acid metal for manufacturing polylactic acid in a ring-opening polymerization of lactide. The application includes adding the organic frame material having copper containing isopoly-molybdic acid metal and lactide to a dry Schlenk reaction tube. Next, a bulk ring-opening polymerization is performed under a reaction temperature to obtain the polylactic acid. The reaction temperature is between 15° and 190° C., and the reaction time is between 2 and 12 hours.

In a further embodiment of the present invention, the ratio between the organic frame material having copper containing isopoly-molybdic acid metal and lactide is between 1:500 and 1:5,000, the weight average molecular weight of the polylactic acid is between 60,000 and 90,000, and the molecular weight distribution index is between 1.3 and 1.6.

The present invention has the following advantages:

The synthesis method of the organic frame material having copper containing isopoly-molybdic acid metal is simple with high yield and reproducibility. The organic frame material having copper containing isopoly-molybdic acid metal shows high catalytic activity towards the ring-opening polymerization of lactide. The resulting polylactic acid has a weight average molecular weight exceeding 60,000. The polylactic acid has great potential in the field of high-polymer materials.

BRIEF DESCRIPTION OF THE DRAWINGS

In order to more clearly illustrate the technical solutions of the embodiments of the present invention, the drawings needed to be used in the description of the embodiments will be briefly introduced below. It is obvious that the drawings in the following description are only some embodiments of the present invention, and it is obvious for those skilled in the art to obtain other drawings based on these drawings without inventive exercise, in which.

DETAILED DESCRIPTION

In order to make the aforementioned objects, features and advantages of the present invention comprehensible, embodiments accompanied with figures are described in detail below.

In the following description, numerous specific details are set forth in order to provide a thorough understanding of the present invention, but the present invention may be practiced in other ways than those specifically described and will be readily apparent to those of ordinary skill in the art without departing from the spirit of the present invention, and therefore the present invention is not limited to the specific embodiments disclosed below.

Example 1

Manufacturing of the organic frame material having copper containing isopoly-molybdic acid metal: Copper nitrate trihydrate (19.3 mg, 0.08 mmol), tfbtb (6.24 mg, 0.02 mmol), sodium molybdate dihydrate (19.4 mg, 0.08 mmol) and deionized water (12 ml) are added to an 18 ml polytetrafluoroethylene autoclave. After the mixture undergoes a reaction at 160° C. for 48 hours, it is slowly cooled to room temperature at the rate of 5° C./hour to obtain green block crystals. The yield is 52.4% (8.8 mg, based on Mo).

Infrared data (KBr, cm$^{-1}$) are 3443 br, 3149 w, 1637 w, 1535 w, 1498 m, 1448 w, 1377 w, 1296 w, 1282 w, 1211 w, 1131 m, 1036 m, 995 s, 945 s, 906 s, 838 s, 734 s, 677 W, 660 m, 640 m, 567 s, 517 m, 448 m.

Example 2

Copper acetate monohydrate (16 mg, 0.08 mmol), tfbtb (6.24 mg, 0.02 mmol), sodium molybdate dihydrate (19.4 mg, 0.08 mmol) and deionized water (12 ml) are added to an 18 ml polytetrafluoroethylene autoclave. After the mixture undergoes a reaction at 160° C. for 48 hours, it is slowly cooled to room temperature at the rate of 5° C./hour to obtain green block crystals. The yield is 42.7% (7.1 mg, based on Mo).

Example 3

Copper sulfate pentahydrate (20 mg, 0.08 mmol), tfbtb (6.24 mg, 0.02 mmol), sodium molybdate dihydrate (19.4 mg, 0.08 mmol) and deionized water (12 ml) are added to an 18 ml polytetrafluoroethylene autoclave. After the mixture undergoes a reaction at 160° C. for 48 hours, it is slowly cooled to room temperature at the rate of 5° C./hour to obtain green block crystals. The yield is 43.3% (7.2 mg, based on Mo).

Example 4

Copper acetate monohydrate (8 mg, 0.04 mmol), copper sulfate pentahydrate (10 mg, 0.04 mmol), tfbtb (6.24 mg, 0.02 mmol), sodium molybdate dihydrate (19.4 mg, 0.08 mmol) and deionized water (12 ml) are added to an 18 ml polytetrafluoroethylene autoclave. After the mixture undergoes a reaction at 160° C. for 72 hours, it is slowly cooled to room temperature at the rate of 5° C./hour to obtain green block crystals. The yield is 43.7% (7.3 mg, based on Mo).

Example 5

Copper nitrate trihydrate (9.65 mg, 0.04 mmol), copper sulfate pentahydrate (10 mg, 0.04 mmol), tfbtb (6.24 mg, 0.02 mmol), sodium molybdate dihydrate (19.4 mg, 0.08 mmol) and deionized water (12 ml) are added to an 18 ml polytetrafluoroethylene autoclave. After the mixture undergoes a reaction at 160° C. for 72 hours, it is slowly cooled to room temperature at the rate of 5° C./hour to obtain green block crystals. The yield is 39.6% (6.6 mg, based on Mo).

Example 6

Copper acetate monohydrate (8 mg, 0.04 mmol), copper nitrate trihydrate (9.65 mg, 0.04 mmol), tfbtb (6.24 mg, 0.02 mmol), sodium molybdate dihydrate (19.4 mg, 0.08 mmol) and deionized water (12 ml) are added to an 18 ml polytetrafluoroethylene autoclave. After the mixture undergoes a reaction at 160° C. for 72 hours, it is slowly cooled to room temperature at the rate of 5° C./hour to obtain green block crystals. The yield is 42.5% (7.1 mg, based on Mo).

Example 7

Copper nitrate trihydrate (9.65 mg, 0.04 mmol), tfbtb (6.24 mg, 0.02 mmol), sodium molybdate dihydrate (19.4 mg, 0.08 mmol) and deionized water (12 ml) are added to an 18 ml polytetrafluoroethylene autoclave. After the mixture undergoes a reaction at 160° C. for 48 hours, it is slowly cooled to room temperature at the rate of 5° C./hour to obtain green block crystals. The yield is 42.8% (7.2 mg, based on Mo).

Example 8

Copper nitrate trihydrate (29 mg, 0.12 mmol), tfbtb (6.24 mg, 0.02 mmol), sodium molybdate dihydrate (19.4 mg, 0.08 mmol) and deionized water (12 ml) are added to an 18 ml polytetrafluoroethylene autoclave. After the mixture undergoes a reaction at 160° C. for 48 hours, it is slowly cooled to room temperature at the rate of 5° C./hour to obtain green block crystals. The yield is 39.9% (6.7 mg, based on Mo).

Example 9

Copper nitrate trihydrate (19.3 mg, 0.08 mmol), tfbtb (6.24 mg, 0.02 mmol), sodium molybdate dihydrate (9.7 mg, 0.04 mmol) and deionized water (12 ml) are added to an 18 ml polytetrafluoroethylene autoclave. After the mixture undergoes a reaction at 160° C. for 48 hours, it is slowly cooled to room temperature at the rate of 5° C./hour to obtain green block crystals. The yield is 43.9% (7.4 mg, based on Mo).

Example 10

Copper nitrate trihydrate (19.3 mg, 0.08 mmol), tfbtb (6.24 mg, 0.02 mmol), sodium molybdate dihydrate (38.8 mg, 0.16 mmol) and deionized water (12 ml) are added to an 18 ml polytetrafluoroethylene autoclave. After the mixture undergoes a reaction at 160° C. for 48 hours, it is slowly cooled to room temperature at the rate of 5° C./hour to obtain green block crystals. The yield is 48.6% (8.2 mg, based on Mo).

Example 11

Copper nitrate trihydrate (19.3 mg, 0.08 mmol), tfbtb (6.24 mg, 0.02 mmol), sodium molybdate dihydrate (29.1 mg, 0.12 mmol) and deionized water (12 ml) are added to an 18 ml polytetrafluoroethylene autoclave. After the mixture undergoes a reaction at 160° C. for 48 hours, it is slowly cooled to room temperature at the rate of 5° C./hour to obtain green block crystals. The yield is 45.6% (7.6 mg, based on Mo).

Example 12

Copper nitrate trihydrate (29 mg, 0.12 mmol), tfbtb (6.24 mg, 0.02 mmol), sodium molybdate dihydrate (38.8 mg, 0.16 mmol) and deionized water (12 ml) are added to an 18 ml polytetrafluoroethylene autoclave. After the mixture undergoes a reaction at 160° C. for 48 hours, it is slowly cooled to room temperature at the rate of 5° C./hour to obtain green block crystals. The yield is 49.5% (8.4 mg, based on Mo).

Example 13

Copper nitrate trihydrate (19.3 mg, 0.08 mmol), tfbtb (6.24 mg, 0.02 mmol), sodium molybdate dihydrate (19.4 mg, 0.08 mmol) and deionized water (8 ml) are added to an 18 ml polytetrafluoroethylene autoclave. After the mixture undergoes a reaction at 160° C. for 48 hours, it is slowly cooled to room temperature at the rate of 5° C./hour to obtain green block crystals. The yield is 42.7% (7.2 mg, based on Mo).

Example 14

Copper nitrate trihydrate (19.3 mg, 0.08 mmol), tfbtb (6.24 mg, 0.02 mmol), sodium molybdate dihydrate (19.4 mg, 0.08 mmol) and deionized water (14 ml) are added to an 18 ml polytetrafluoroethylene autoclave. After the mixture undergoes a reaction at 160° C. for 48 hours, it is slowly cooled to room temperature at the rate of 5° C./hour to obtain green block crystals. The yield is 38.5% (6.5 mg, based on Mo).

Example 15

Copper nitrate trihydrate (19.3 mg, 0.08 mmol), tfbtb (6.24 mg, 0.02 mmol), sodium molybdate dihydrate (19.4 mg, 0.12 mmol) and deionized water (12 ml) are added to an 18 ml polytetrafluoroethylene autoclave. After the mixture undergoes a reaction at 140° C. for 48 hours, it is slowly cooled to room temperature at the rate of 5° C./hour to obtain green block crystals. The yield is 46.8% (7.9 mg, based on Mo).

Example 16

Copper nitrate trihydrate (19.3 mg, 0.08 mmol), tfbtb (6.24 mg, 0.02 mmol), sodium molybdate dihydrate (19.4 mg, 0.12 mmol) and deionized water (12 ml) are added to an 18 ml polytetrafluoroethylene autoclave. After the mixture undergoes a reaction at 180° C. for 48 hours, it is slowly cooled to room temperature at the rate of 5° C./hour to obtain green block crystals. The yield is 50.8% (8.5 mg, based on Mo).

Example 17

Copper nitrate trihydrate (19.3 mg, 0.08 mmol), tfbtb (6.24 mg, 0.02 mmol), sodium molybdate dihydrate (19.4 mg, 0.08 mmol) and deionized water (8 ml) are added to an 18 ml polytetrafluoroethylene autoclave. After the mixture undergoes a reaction at 160° C. for 24 hours, it is slowly cooled to room temperature at the rate of 5° C./hour to obtain green block crystals. The yield is 48.1% (6.4 mg, based on Mo).

Example 18

Copper nitrate trihydrate (19.3 mg, 0.08 mmol), tfbtb (6.24 mg, 0.02 mmol), sodium molybdate dihydrate (19.4 mg, 0.08 mmol) and deionized water (14 ml) are added to an 18 ml polytetrafluoroethylene autoclave. After the mixture undergoes a reaction at 160° C. for 72 hours, it is slowly cooled to room temperature at the rate of 5° C./hour to obtain green block crystals. The yield is 49.3% (8.3 mg, based on Mo).

Example 19

Copper nitrate trihydrate (19.3 mg, 0.08 mmol), tfbtb (6.24 mg, 0.02 mmol), sodium molybdate dihydrate (19.4 mg, 0.08 mmol) and deionized water (12 ml) are added to an 18 ml polytetrafluoroethylene autoclave. After the mixture undergoes a reaction at 140° C. for 72 hours, it is slowly cooled to room temperature at the rate of 5° C./hour to obtain green block crystals. The yield is 48.4% (8.1 mg, based on Mo).

Example 20

Copper nitrate trihydrate (19.3 mg, 0.08 mmol), tfbtb (6.24 mg, 0.02 mmol), sodium molybdate dihydrate (19.4 mg, 0.08 mmol) and deionized water (12 ml) are added to an 18 ml polytetrafluoroethylene autoclave. After the mixture undergoes a reaction at 180° C. for 24 hours, it is slowly cooled to room temperature at the rate of 5° C./hour to obtain green block crystals. The yield is 45.7% (7.6 mg, based on Mo).

Example 21

Copper nitrate trihydrate (19.3 mg, 0.08 mmol), tfbtb (6.24 mg, 0.02 mmol), sodium molybdate dihydrate (29.1 mg, 0.12 mmol) and deionized water (12 ml) are added to an 18 ml polytetrafluoroethylene autoclave. After the mixture undergoes a reaction at 140° C. for 24 hours, it is slowly cooled to room temperature at the rate of 5° C./hour to obtain green block crystals. The yield is 39.4% (6.6 mg, based on Mo).

Example 22

Copper nitrate trihydrate (19.3 mg, 0.08 mmol), tfbtb (6.24 mg, 0.02 mmol), sodium molybdate dihydrate (29.1 mg, 0.12 mmol) and deionized water (8 ml) are added to an 18 ml polytetrafluoroethylene autoclave. After the mixture undergoes a reaction at 180° C. for 72 hours, it is slowly cooled to room temperature at the rate of 5° C./hour to obtain green block crystals. The yield is 47.2% (8.8 mg, based on Mo).

Comparative Example 1

The copper salt is replaced with other metal salts (such as calcium nitrate, magnesium nitrate, aluminum nitrate, iron nitrate, cobalt nitrate or nickel nitrate, 0.4 mmol). The other metal salts, tfbtb (6.24 mg, 0.02 mmol), sodium molybdate dihydrate (19.4 mg, 0.08 mmol) and deionized water (12 ml) are added to an 18 ml polytetrafluoroethylene autoclave. After the mixture undergoes a reaction at 160° C. for 48 hours, it is slowly cooled to room temperature at the rate of 5° C./hour. No crystal sample suitable for X-ray single crystal analysis is obtained. The product is amorphous powders with undefined structure.

Comparative Example 2

Sodium molybdate dihydrate is replaced with other molybdenum salts (such as ammonium molybdate or phosphomolybdic acid, 0.08 mmol). The other molybdenum salts, copper nitrate trihydrate (19.3 mg, 0.08 mmol), tfbtb (6.24 mg, 0.02 mmol) and deionized water (12 ml) are added to an 18 ml polytetrafluoroethylene autoclave. After the mixture undergoes a reaction at 160° C. for 48 hours, it is slowly cooled to room temperature at the rate of 5° C./hour. No crystal sample suitable for X-ray single crystal analysis is obtained. The product is amorphous powders with undefined structure.

Comparative Example 3

Tfbtb is replaced with imidazole ligands (such as imidazole, 2-methylimidazole or benzimidazole, 0.02 mmol,). The imidazole ligands, copper nitrate trihydrate (19.3 mg, 0.08 mmol), sodium molybdate dihydrate (19.4 mg, 0.08 mmol) and deionized water (12 ml) are added to an 18 ml polytetrafluoroethylene autoclave. After the mixture undergoes a reaction at 160° C. for 48 hours, it is slowly cooled to room temperature at the rate of 5° C./hour. No crystal sample suitable for X-ray single crystal analysis is obtained. The product is amorphous powders with undefined structure.

Example 23

The organic frame material having copper containing isopoly-molybdic acid metal prepared in Example 1 is characterized as follows.
(1) Crystal Structure Determination of Organic Frame Material Having Copper Containing Isopoly-Molybdic Acid Metal.

The crystal structure is determined by a Bruker Apex II CCD diffractometer with graphite monochromated Mo Kα ray (λ=0.71073 Å) at 293 (2) K by ω scanning to collect the diffraction points. The collected data are restored by a SAINT program, and semi empirical absorption correction is performed by SADABS method.

The structure analysis and refinement are completed by SHELLXS and SHELLXL of SHELLXTL program respectively. $F^2$ is modified by a full matrix least square method to obtain the coordinates and anisotropy parameters of all non-hydrogen atoms. All hydrogen atoms are theoretically fixed to the parent atom in the process of structural refinement, and the isotropic displacement parameter is slightly larger than the parent atom displacement parameter (C—H, 1.2, or N—H, 1.2 times). Table 1 shows detailed crystal measurement data.

TABLE 1

| Crystallographic data of organic frame material having copper containing isopoly-molybdic acid metal | |
|---|---|
| Molecular formula | $C_6H_6CuF_2Mo_4N_3O_{14}$ |
| Molecular weight | 829.44 |
| Crystal size | 0.24 mm × 0.22 mm × 0.18 mm |
| Crystallographic system | triclinic |
| Space group | P-1 |
| Cell parameters | a = 8.0830(6) Å |
| | b = 8.1875(6) Å |
| | c = 13.0890(9) Å |
| | α = 82.071(6)° |
| | β = 79.008(6)° |
| | γ = 78.452(6)° |
| Volume | 828.62(11) Å$^3$ |
| Number of repeating units in cell | 2 |
| Density (calculated) | 3.324 mg m$^{-3}$ |
| Absorption coefficient | 4.313 |
| Absorption correction | Semi-empirical |

TABLE 1-continued

Crystallographic data of organic frame material having copper containing isopoly-molybdic acid metal

| Refinement | Least square |
|---|---|
| $F^2$ base fit | 1.006 |
| Final R factor [I > 2σ(I)] | $R_1$ = 0.0277 |
| R factor (all data) | $R_1$ = 0.0338 |
| Residual error | 0.745 eÅ$^{-3}$, −0.949 eÅ$^{-3}$ |

Figure 1:
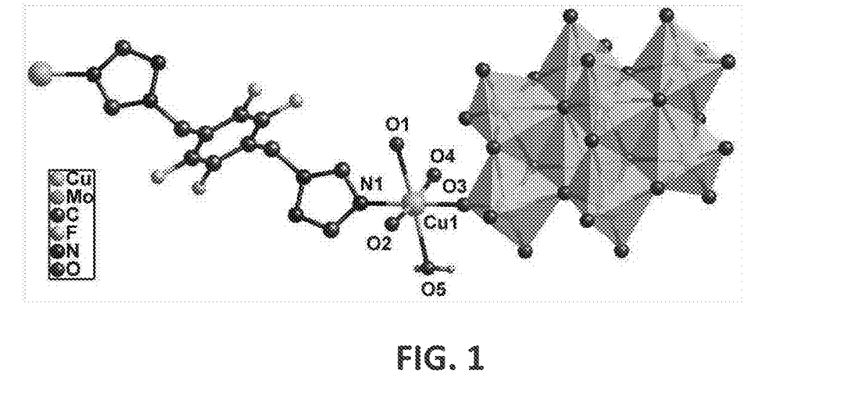
FIG. 1 is a diagram showing the coordination environment of copper ions in the organic frame material having copper containing isopoly-molybdic acid metal according to an embodiment of the present invention.
Figure 2:
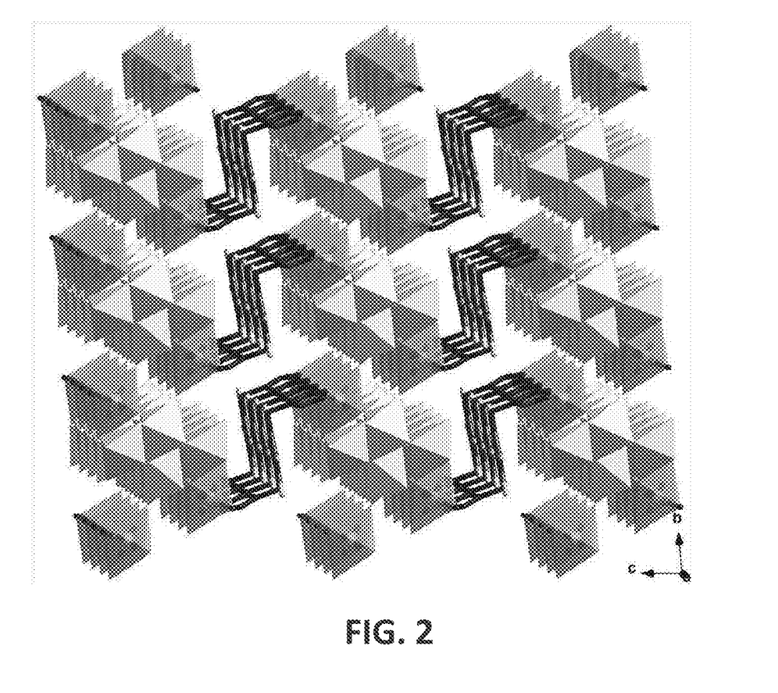
FIG. 2 is a schematic three-dimensional network structure diagram showing the organic frame material having copper containing isopoly-molybdic acid metal according to an embodiment of the present invention.

FIG. 1 shows the coordination environment of the copper ions. FIG. 2 shows a three-dimensional network structure. FIG. 1 shows the coordination environment of the copper ions in an organic frame material having copper containing isopoly-molybdic acid metal. FIG. 2 shows a three-dimensional network structure diagram of an organic frame material having copper containing isopoly-molybdic acid metal.

Figure 3:
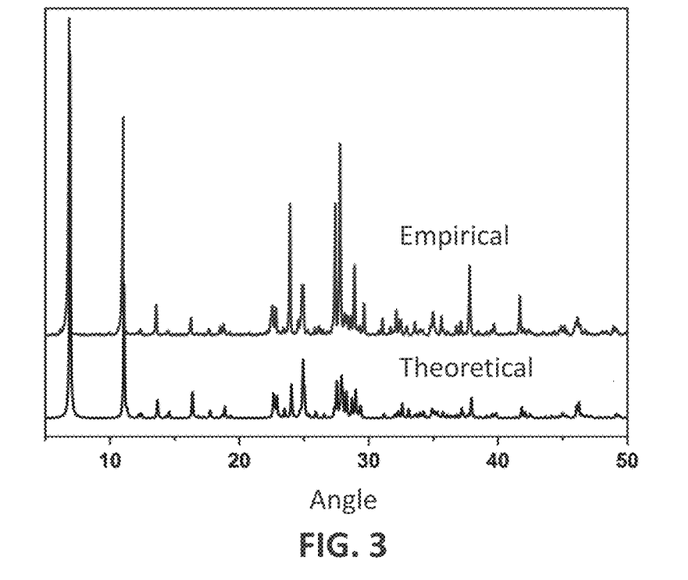
FIG. 3 is a powder diffraction diagram of the organic frame material having copper containing isopoly-molybdic acid metal according to an embodiment of the present invention.

(2) Characterization of Phase Purity of Organic Frame Material Having Copper Containing Isopoly-Molybdic Acid Metal Turning to FIG. 3, the powder diffraction diagram of the organic frame material having copper containing isopoly-molybdic acid metal shows that it has a reliable phase purity, which ensures its catalytic activity in the ring-opening polymerization of lactide. (A RIGAKU d/max-2500 instrument is used.)

Figure 4:
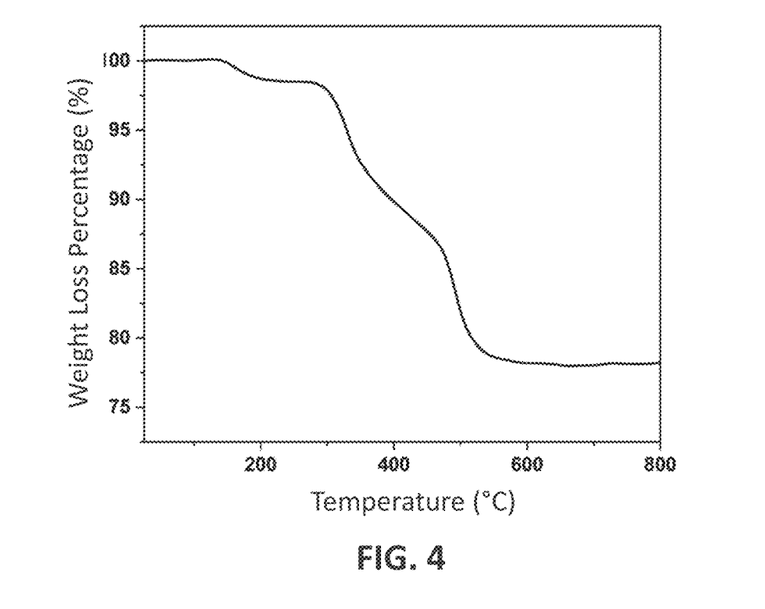
FIG. 4 is a thermogravimetric diagram of the organic frame material having copper containing isopoly-molybdic acid metal according to an embodiment of the present invention.

(3) Characterization of Heat Stability of Organic Frame Material Having Copper Containing Isopoly-Molybdic Acid Metal The thermal stability of the organic frame material having copper containing isopoly-molybdic acid metal can be characterized by a thermogravimetric analyzer. The result shows the organic frame material having copper containing isopoly-molybdic acid metal has high heat stability up to 265° C. FIG. 4 shows the thermogravimetric diagram of the organic frame material having copper containing isopoly-molybdic acid metal (instrument model: NETZSCH/TG 209 F3).

Example 24

Using the organic frame material having copper containing isopoly-molybdic acid metal of Example 1 to catalyze lactide for the manufacturing of PLA 2,880.00 mg lactide (20.00 mmol) and 8.3 mg organic frame material having copper containing isopoly-molybdic acid metal (0.01 mmol) are added to Schlenk reaction tubes. The tubes are heated to and remain at 180° C. for 6 hours to react. After the polymerization is completed, the product is cooled to room temperature. The product is dissolved in 15 ml dichloromethane. The organic frame material having copper containing isopoly-molybdic acid metal is recovered by centrifugation. Then, 60 ml of methanol is added to the filtrate to precipitate the polymer. The polymer is dried in a vacuum at 50° C. to obtain the white PLA product.

Figure 5:
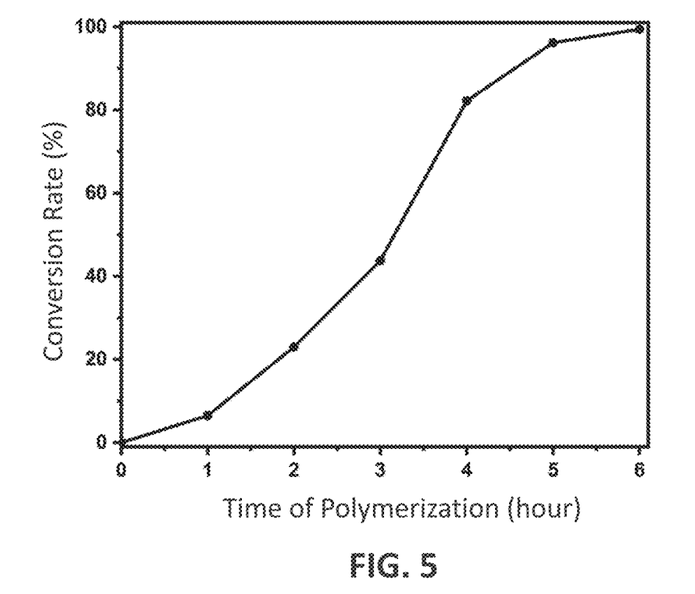
FIG. 5 is a graph showing the conversion rate and reaction time of ring-opening polymerization of lactide catalyzed by the organic frame material having copper containing isopoly-molybdic acid metal according to an embodiment of the present invention.

The relationship between the conversion rate and the reaction time is determined by $^1$H NMR quantitative analysis, as shown in FIG. 5, which provides a graph of the conversion rate and reaction time of the organic frame material having copper containing isopoly-molybdic acid metal to catalyze the ring-opening polymerization of lactide (instrument model: Bruker AVANCE 400 MHZ).

Example 25

2,880.00 mg lactide (20.00 mmol) and 33.2 mg organic frame material having copper containing isopoly-molybdic acid metal (0.04 mmol) are added to Schlenk reaction tubes. The tubes are heated to and remain at 180° C. for 6 hours to react. After the polymerization is completed, the product is cooled to room temperature. The product is dissolved in 15 ml dichloromethane. The organic frame material having copper containing isopoly-molybdic acid metal is recovered by centrifugation. Then, 60 ml of methanol is added to the filtrate to precipitate the polymer. The polymer is dried in a vacuum at 50° C. to obtain the white PLA product.

Example 26

2,880.00 mg lactide (20.00 mmol) and 4.15 mg organic frame material having copper containing isopoly-molybdic acid metal (0.004 mmol) are added to Schlenk reaction tubes. The tubes are heated to and remain at 180° C. for 6 hours to react. After the polymerization is completed, the product is cooled to room temperature. The product is dissolved in 15 ml dichloromethane. The organic frame material having copper containing isopoly-molybdic acid metal is recovered by centrifugation. Then, 60 ml of methanol is added to the filtrate to precipitate the polymer. The polymer is dried in a vacuum at 50° C. to obtain the white PLA product.

Example 27

2,880.00 mg lactide (20.00 mmol) and 8.3 mg organic frame material having copper containing isopoly-molybdic acid metal (0.01 mmol) are added to Schlenk reaction tubes. The tubes are heated to and remain at 150° C. for 6 hours to react. After the polymerization is completed, the product is cooled to room temperature. The product is dissolved in 15 ml dichloromethane. The organic frame material having copper containing isopoly-molybdic acid metal is recovered by centrifugation. Then, 60 ml of methanol is added to the filtrate to precipitate the polymer. The polymer is dried in a vacuum at 50° C. to obtain the white PLA product.

Example 28

2,880.00 mg lactide (20.00 mmol) and 8.3 mg organic frame material having copper containing isopoly-molybdic acid metal (0.01 mmol) are added to Schlenk reaction tubes. The tubes are heated to and remain at 190° C. for 6 hours to react. After the polymerization is completed, the product is cooled to room temperature. The product is dissolved in 15 ml dichloromethane. The organic frame material having copper containing isopoly-molybdic acid metal is recovered by centrifugation. Then, 60 ml of methanol is added to the filtrate to precipitate the polymer. The polymer is dried in a vacuum at 50° C. to obtain the white PLA product.

Example 29

2,880.00 mg lactide (20.00 mmol) and 8.30 mg organic frame material having copper containing isopoly-molybdic acid metal (0.01 mmol) are added to Schlenk reaction tubes. The tubes are heated to and remain at 180° C. for 2 hours to react. After the polymerization is completed, the product is cooled to room temperature. The product is dissolved in 15 ml dichloromethane. The organic frame material having copper containing isopoly-molybdic acid metal is recovered by centrifugation. Then, 60 ml of methanol is added to the filtrate to precipitate the polymer. The polymer is dried in a vacuum at 50° C. to obtain the white PLA product.

Example 30

2,880.00 mg lactide (20.00 mmol) and 8.30 mg organic frame material having copper containing isopoly-molybdic acid metal (0.01 mmol) are added to Schlenk reaction tubes. The tubes are heated to and remain at 180° C. for 12 hours to react. After the polymerization is completed, the product is cooled to room temperature. The product is dissolved in 15 ml dichloromethane. The organic frame material having copper containing isopoly-molybdic acid metal is recovered by centrifugation. Then, 60 ml of methanol is added to the filtrate to precipitate the polymer. The polymer is dried in a vacuum at 50° C. to obtain the white PLA product.

Example 31

(1) Measurement of the Molecular Weight of the PLA of Example 24

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 86,375, and the molecular weight distribution index is approximately 1.41.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 100,000 are used.

(2) Measurement of the Molecular Weight of the PLA of Example 25

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 81,013, and the molecular weight distribution index is approximately 1.53.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 100,000 are used.

(3) Measurement of the Molecular Weight of the PLA of Example 26

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 71,441, and the molecular weight distribution index is approximately 1.47.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 100,000 are used.

(4) Measurement of the Molecular Weight of the PLA of Example 27

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 63,871, and the molecular weight distribution index is approximately 1.55.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 100,000 are used.

(5) Measurement of the Molecular Weight of the PLA of Example 28

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 68,710, and the molecular weight distribution index is approximately 1.52.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 100,000 are used.

(6) Measurement of the Molecular Weight of the PLA of Example 29

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 67,196, and the molecular weight distribution index is approximately 1.49.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 100,000 are used.

(7) Measurement of the Molecular Weight of the PLA of Example 30

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 72,681, and the molecular weight distribution index is approximately 1.54.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 100,000 are used.

Comparative Example 4

2,880.00 mg lactide (20.00 mmol) and 2.41 mg copper nitrate trihydrate (0.01 mmol) are added to Schlenk reaction tubes. The tubes are heated to and remain at 180° C. for 6 hours to react. The conversion rate is determined by 1H NMR quantitative analysis. The calculated conversion rate is 62.7%. 7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 10,863, and the molecular weight distribution index is approximately 1.58.

Comparative Example 5

2,880.00 mg lactide (20.00 mmol) and 8.30 mg tfbtb (0.01 mmol) are added to Schlenk reaction tubes. The tubes are heated to and remain at 180° C. for 6 hours to react. The conversion rate is determined by $^1$H NMR quantitative analysis. There is no conversion of lactide, and no PLA is obtained.

Comparative Example 6

2,880.00 mg lactide (20.00 mmol) and 2.43 mg sodium molybdate dihydrate (0.01 mmol) are added to Schlenk reaction tubes. The tubes are heated to and remain at 180° C. for 6 hours to react. The conversion rate is determined by 1H NMR quantitative analysis. The conversion rate is exceptionally low. The monomer conversion rate is 9%, the weight average molecular weight is 780, and the molecular weight distribution index is 1.12.

The present invention provides an organic frame material having isopoly-molybdic acid metal for manufacturing polylactic acid, and a method of manufacturing the same is provided. The chemical formula of the organic frame material having isopoly-molybdic acid metal is $[Cu(tfbtb)_{0.5}(\beta\text{-}Mo_8O_{26})0.5(H_2O)]$. tfbtb is a 2,3,5,6-tetrafluoro-bis (1,2,4-triazole-1-methyl) benzene ligand, and $[\beta\text{-}Mo_8O_{26}]$ is a β type octamolybdate anion. Sodium molybdate dihydrate, copper salt and organic ligand 2,3,5,6-tetrafluoro-bis (1,2,4-triazole-1-methyl) benzene undergo hydrothermal reaction in a closed condition to form the organic frame material having copper containing isopoly-molybdic acid metal that has a three-dimensional structure. The synthesis method is simple with high yield and reproducibility. The organic frame material having isopoly-molybdic acid metal shows high catalytic activity towards the ring-opening polymerization of lactide. The resulting polylactic acid has a weight average molecular weight exceeding 60,000. The polylactic acid has great potential in the fields of packaging materials and medical high polymer materials.

It should be noted that the above-mentioned embodiments are only for illustrating the technical solutions of the present invention and not for limiting, and although the present invention has been described in detail with reference to the further embodiments, it should be understood by those skilled in the art that modifications or equivalent substitutions may be made on the technical solutions of the present invention without departing from the spirit and scope of the technical solutions of the present invention, which should be covered by the claims of the present invention.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within ±10%, ±5%, ±1%, or ±0.5% of the average of the values.

The invention claimed is:

1. An organic frame material having isopoly-molybdic acid metal for manufacturing polylactic acid, the organic frame material having isopoly-molybdic acid metal having a chemical formula of $[Cu(tfbtb)_{0.5}(\beta\text{-}Mo_8O_{26})0.5(H_2O)]$, wherein tfbtb is a 2,3,5,6-tetrafluoro-bis (1,2,4-triazole-1-methyl) benzene ligand, $[\beta\text{-}Mo_8O_{26}]$ is β type octamolybdate anion.

2. The organic frame material having isopoly-molybdic acid metal for manufacturing polylactic acid of claim 1, wherein the organic frame material having isopoly-molybdic acid metal has a secondary structural unit being a triclinic crystal system, a space group of P-1, a molecular formula of $C_6H_6CuF_2Mo_4N_3O_{14}$, a molecular weight of 829.44, cell parameters of a=8.0830(6) Å, b=8.1875 (6) Å, c=13.0890 (9) Å, α=82.071 (6) °, β=79.008 (6) °, γ=78.452 (6) °, a cell volume of 828.62 (11) Å$^3$, Z=2, and the organic frame material having isopoly-molybdic acid metal has a basic structure of a three-dimensional network structure of a copper ion coordinating with 2,3,5,6-tetrafluoro-bis (1,2,4-triazole-1-methyl) benzene and molybdate radical $[\beta\text{-}Mo_8O_{26}]$.

3. A method of manufacturing the organic frame material having isopoly-molybdic acid metal for manufacturing polylactic acid of claim 1 comprising:
adding a copper salt, sodium molybdate dihydrate, 2,3,5,6-tetrafluoro-bis (1,2,4-triazole-1-methyl) benzene and distilled water into a reactor;
heating the reactor in an oven for a period of time to form a mixture;
cooling the reactor to the room temperature;
performing dry centrifugation to the mixture to obtain a crystal of the organic frame material having isopoly-molybdic acid metal;
rinsing the crystal of the organic frame material having isopoly-molybdic acid metal with deionized water and ethanol; and
drying the crystal of the organic frame material having isopoly-molybdic acid metal to obtain the organic frame material having isopoly-molybdic acid metal,
wherein the reactor is heated in the oven at a temperature ranging between 14° and 180° C. for the period of time between 24 and 72 hours.

4. The method of claim 3, wherein the copper salt is selected from any one or more of copper nitrate, copper acetate and copper sulfate.

5. The method of claim 3, wherein the mass ratio between the copper salt and the sodium molybdate dihydrate is between 1:1 and 1:2.

6. The method of claim 3, wherein the mass ratio between the 2,3,5,6-tetrafluoro-bis (1,2,4-triazole-1-methyl) benzene and the copper salt is between 1:2 and 1:6.

7. The method of claim 3, wherein the ratio between the 2,3,5,6-tetrafluoro-bis (1,2,4-triazole-1-methyl) benzene and the sodium molybdate dihydrate is between 1:2 and 1:8.

8. The method of claim 3, wherein each 0.01 mmol of 2,3,5,6-tetrafluoro-bis (1,2,4-triazole-1-methyl) benzene corresponds to 4 to 7 ml water.

9. A method for manufacturing polylactic acid of claim 1 by a ring opening polymerization of lactide comprising:
adding the organic frame material having copper containing isopoly-molybdic acid metal of claim 1 and lactide into a dry Schlenk reaction tube; and effecting a bulk ring opening polymerization under a reaction temperature to obtain the polylactic acid, wherein the reaction temperature is between 15° and 190° C., and a reaction time is between 2 and 12 hours.

10. The method of claim 9, wherein the ratio between the organic frame material having copper containing isopolymolybdic acid metal and lactide is between 1:500 and 1:5000, the weight average molecular weight of the polylactic acid is between 60,000 and 90,000, and the molecular weight distribution index is between 1.3 and 1.6.

* * * * *